June 23, 1925.
T. ZIMMERMAN
AXLE
Filed June 25, 1919     2 Sheets-Sheet 2
1,543,147
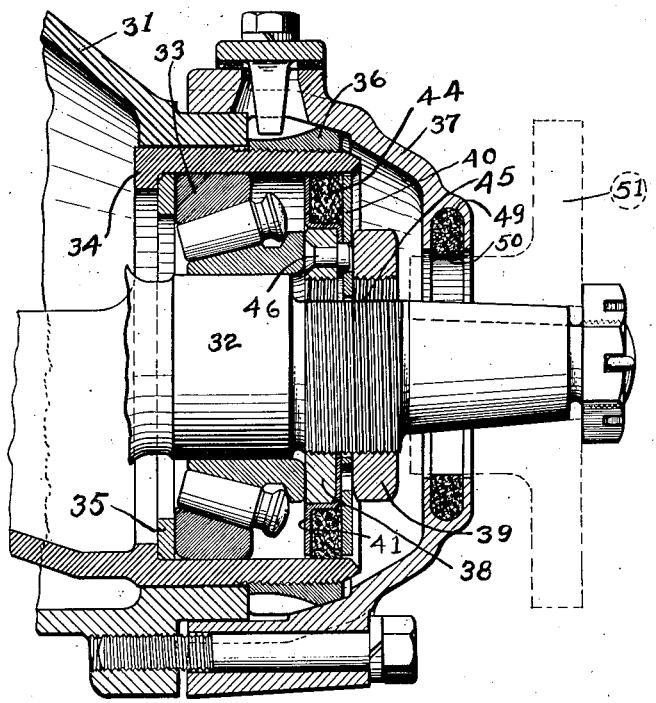
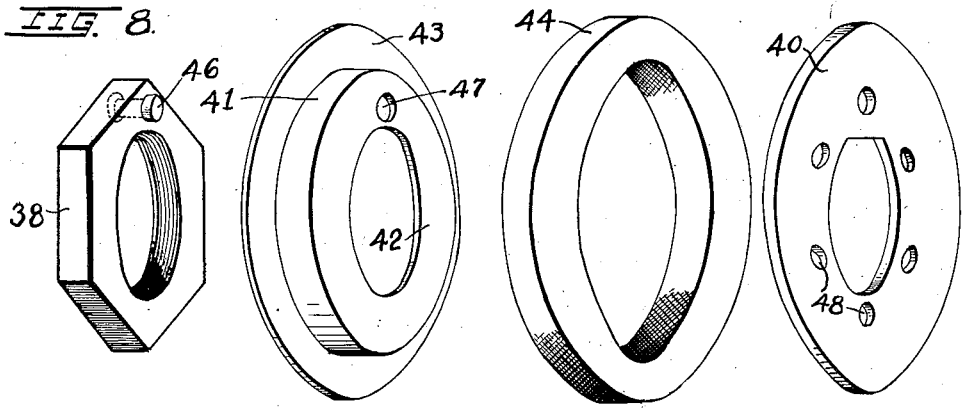
Inventor
THOMAS ZIMMERMAN.
By
Attorney Patented June 23, 1925.

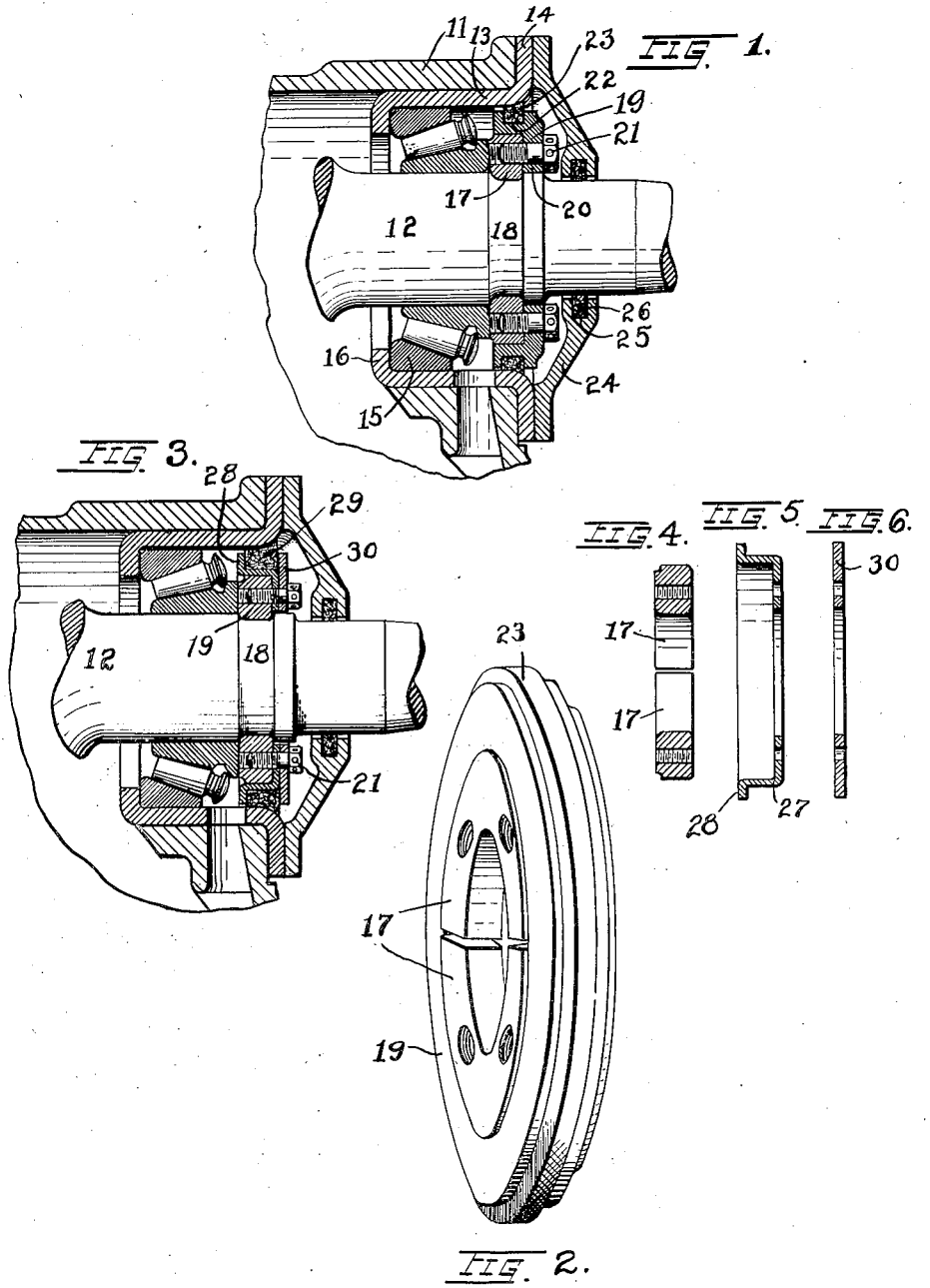

1,543,147

UNITED STATES PATENT OFFICE.

THOMAS ZIMMERMAN, OF CLEVELAND, OHIO, ASSIGNOR, BY MESNE ASSIGNMENTS, TO THE EATON AXLE & SPRING COMPANY, OF CLEVELAND, OHIO, A CORPORATION OF OHIO.

AXLE.

Application filed June 25, 1919. Serial No. 306,633.

*To all whom it may concern:*

Be it known that I, THOMAS ZIMMERMAN, a citizen of the United States, and a resident of Cleveland, county of Cuyahoga, State of Ohio, have invented certain new and useful Improvements in Axles, of which the following is a specification.

This invention relates to shaft mountings and more particularly to the mountings of shafts which are subjected to end thrust and are supported in roller bearings.

One object of the invention is to provide a shaft with a removable thrust collar adapted to transmit axial thrust to or from the shaft or to cooperate with a bearing, in which the shaft is mounted, to prevent relative movement of the parts. Another object of the invention is to provide such a thrust collar, adapted to exclude dirt and moisture from the housing in which the shaft is mounted, and a still further object is to provide means for transmitting thrust which is adjustable on the shaft and adapted to exclude dirt and moisture from the housing.

Other objects and the features of novelty will be apparent from the following description, taken in connection with the accompanying drawings, in which:—

Figure 1 is a fragmentary sectional view of the axle housing of a motor vehicle driving axle showing one end of a worm driving shaft mounted therein, in accordance with my invention;

Fig. 2 is an enlarged perspective view of certain parts of the structure shown in Fig. 1 in assembled relation;

Fig. 3 is a view similar to Fig. 1, but showing a slightly modified structure;

Figs. 4, 5 and 6 are sectional views of certain of the parts shown in Fig. 3;

Fig. 7 is a fragmentary sectional view of the axle housing of a motor vehicle driving axle, showing a structure embodying my invention, as applied to a driving shaft which is adjustable relatively to the axle housing; and Figs. 8, 9, 10 and 11 are perspective views of certain of the elements shown in Fig. 7.

In the embodiment of my invention shown in Figs 1 and 2, 11 indicates an axle housing for a motor vehicle axle in which the worm shaft 12 is adapted to be rotatably mounted. The axle housing 11 is formed with a cylindrical bore in which a bearing cup 13 is carried, the bearing cup being provided with a circumferential radially extending flange 14 by which it may be secured to the axle housing 11. The bearing 15, in which the shaft 12 is mounted, is seated in the bearing cup 13 and is held from axial motion therein by the flange 16 which extends radially inwardly at the bottom of the bearing cup 13. In order to transmit the thrust toward the left, in Fig. 1, from the shaft 12 to the bearing 15, and to prevent motion of the inner race member of the bearing toward the right, it is necessary to provide an abutment on the shaft to cooperate with the inner race member of the bearing. For this purpose, I have provided a split ring 17, which is seated in a circumferential groove 18 in the worm shaft 12, the ring 17 being split diametrically so that it can be assembled in the groove 18, and the parts thereof held in assembled relation by the lock ring 19, which is continuous and surrounds the split ring. The lock ring 19 is formed with a radially inwardly extending flange 20 through which screws 21 pass, to engage the parts of the split ring 17 and hold the rings in fixed relative position, and the inner ring 17, together with the lock ring 19, and the means for holding the rings together constitute a removable thrust collar which will be firmly held from motion axially on the shaft 12.

The lock ring 19 has a circumferential groove 22 in its outer periphery to receive a packing ring 23, the packing ring being adapted to engage the bearing cup 13, to prevent dirt and moisture from entering the bearing. A cap 24 is fitted to the bearing cup 13 and is adapted to be secured in place to close the outer end thereof, an opening being provided in the cap 24 through which the shaft 12 extends, and a circumferential groove 25 is formed in the cap at its inner periphery to receive a packing ring 26, which is adapted to engage the shaft and further seal the housing from the entrance of dirt and moisture.

As shown in Figs. 3 to 6, the thrust collar may be formed of an inner split ring 17 identical with that shown in Fig. 1, and an outer ring 27 formed of sheet metal, cupped to receive the inner ring 19 to hold the parts of the inner ring seated in the groove 18, the screws 21 cooperating to hold the rings in proper relative position axially, as in the construction illustrated in Fig. 1. If it is desired, the outer ring 27 may be provided with an outwardly extending flange 28 and a packing ring 29 secured in place between the flange 28 and a washer 30 mounted on the shaft 12 in abutting relation to the ring 27 and held in place by the screws 21.

In Figs. 7 to 11, I have shown a shaft provided, in accordance with my invention, with means thereon for transmitting axial thrust, said means being adjustable axially of the shaft. In Fig. 7, 31 indicates the axle housing extension of a motor vehicle axle in which a driving shaft 32 is mounted in a bearing 33. The axle housing extension 31 is formed with a cylindrical bore in which a bearing cup 34 is supported, the bearing cup having a ring 35 therein against which the bearing 33 is adapted to be seated. An adjusting ring 36 is mounted in threaded engagement with the bearing cup 34, adapted upon rotation to adjustably position the bearing cup within the axle housing extension 31, and a cap 37 is secured to the end of the axle housing extension and is adapted to clamp the adjusting ring 36 into engagement with the bearing cup 34, and to hold the adjusting ring in adjusted position.

In order to adjust the shaft 32 relatively to its bearing cup 34 and to insure that the parts of the bearing will, at all times, be held in proper relative position, an adjusting nut 38 is provided in threaded engagement with the shaft 32. A lock nut 39 is also threaded on the shaft 32 to hold the adjusting nut 38 in its adjusted position, and a lock washer 40 and a packing retaining ring 41, similar in general outline and formation to members 27 and 30, shown in Figs. 3, 5 and 6, are mounted on the shaft between the adjusting nut 38 and its lock nut 39. The packing retaining ring 41, more clearly shown in Fig. 9, is preferably a cupped sheet metal member comprising a cylindrical body portion having a radially inwardly extending flange 42 at one edge, and a radially outwardly extending flange 43 at the other edge, so that when assembled with the lock washer 40, an annular recess is formed between the ring and the washer in which a packing ring 44 may be retained.

The shaft 32 is flattened, as shown at 45, and the lock washer 40 is formed with an opening therein which closely conforms to the configuration of the shaft, the flat surface of the washer being adapted to engage with the surface 45 of the shaft 32 so that the lock washer will rotate with the shaft. The adjusting nut 38 is provided with a stud 46 which is adapted to extend through an opening 47 in the packing retaining ring 41 and through one of a circular series of openings 48 in the lock washer 40, when the parts are in assembled position. It will be understood that the adjusting nut 38 may be adjusted to any one of a number of positions, corresponding to the openings 48 in the lock washer 40, and that when so adjusted, by reason of the engagement of the stud 46 in the opening in the lock washer 40, the adjusting nut 38, the packing retaining ring 41 and the lock washer 40 will rotate together with the shaft 32, the lock nut 39 also rotating with the shaft, by reason of its frictional engagement with the lock washer and with the shaft. The cap 37 is provided with an opening through which the shaft 32 extends and a circumferential recess 49 is formed in the cap at its inner periphery to receive the packing ring 50, which is adapted to engage with the shaft 32, or, as shown in Fig. 7, with a universal joint member 51 which is mounted upon the shaft. In the structures shown and described, the shaft is provided with means which will effectively cooperate with the bearing in which the shaft is mounted to transmit end thrust thereto and the housing in which the bearing is carried is effectively sealed against the entrance of dirt and moisture.

While I have illustrated and described what I now consider to be preferred forms of structure embodying my invention, it is understood that the principles of the invention are not limited to the details of construction which I have shown and described, but that changes may be made in such details, without departing from the spirit of the invention which is defined in the appended claims.

Having thus described my invention, what I claim is:—

1. In mechanism of the class described, the combination of a shaft having a shoulder thereon, and a collar on said shaft cooperating with said shoulder to transmit axial thrust, comprising a ring formed of a plurality of sections, and means slidable axially over said ring for holding the parts of said ring in assembled relation.

2. In mechanism of the class described, the combination of a shaft having a shoulder thereon, and a collar on said shaft cooperating therewith to transmit axial thrust, comprising an inner ring composed of a plurality of sections, and an outer ring surrounding said inner ring slidable axially into position and adapted to hold the parts of said inner ring in assembled relation.

3. In mechanism of the class described, the combination of a shaft having a shoulder thereon, and a collar on said shaft cooperating with said shoulder to transmit axial thrust, comprising an inner ring composed of a plurality of sections, a continuous outer ring surrounding said inner ring and having a radially inwardly extending flange, and means cooperating with said flange to hold the parts of said inner ring in fixed relation thereto.

4. In mechanism of the class described, the combination of a shaft having a shoulder thereon, and a collar on said shaft cooperating with said shoulder to transmit axial thrust, comprising an inner ring composed of a plurality of sections, a continuous outer ring surrounding said inner ring and having a radially inwardly extending flange, and threaded members for securing the parts of said inner ring in said outer ring.

5. In mechanism of the class described, the combination of a shaft having a shoulder thereon, and a collar on said shaft cooperating therewith to transmit axial thrust, comprising an inner ring composed of a plurality of sections, and an outer ring surrounding said inner ring and adapted to hold the parts of said inner ring in assembled relation, said outer ring having a circumferential recess for the reception of packing.

6. In mechanism of the class described, the combination of a shaft having a shoulder thereon, and a collar on said shaft cooperating with said shoulder to transmit axial thrust, comprising a diametrically split inner ring, a continuous outer ring surrounding said inner ring and having an inwardly extending flange thereon, and threaded members cooperating with said flange to hold the parts of said inner ring in fixed relation thereto, said outer ring having a circumferential recess for the reception of packing.

7. In mechanism of the class described, the combination of a shaft having a shoulder thereon, and a collar on said shaft cooperating therewith to transmit axial thrust, comprising an inner ring composed of a plurality of sections, and a cupped sheet metal member surrounding said inner ring and adapted to hold the parts thereof in assembled relation.

8. In mechanism of the class described, the combination of a shaft having a shoulder thereon, and a collar on said shaft cooperating therewith to transmit axial thrust, comprising an inner ring composed of a plurality of sections, and a cupped member surrounding said inner ring to hold the parts thereof in assembled relation, an annular member abutting said cupped member, threaded means for holding said inner ring, said cupped member and said annular member in fixed relation, and packing between said cupped member and said annular member and engaging said supporting means.

9. In mechanism of the class described, the combination of a housing, a shaft having an annular abutment thereon rotatably mounted in said housing, a thrust collar on said shaft cooperating with said abutment to transmit axial thrust, and packing carried by said thrust collar and engaging said housing.

10. In mechanism of the class described, the combination of a housing, a shaft, a thrust collar rotatable with said shaft having a circumferential groove therein, packing in said groove engaging said housing, a cap carried by said housing and surrounding said shaft, and packing carried by said cap and engaging said shaft.

11. In mechanism of the class described, the combination of a housing, a shaft, and means mounted on said shaft and cooperating therewith to transmit axial thrust, comprising an annular member held against rotation on said shaft, said member having a substantially cylindrical portion and a flange extending radially outwardly therefrom, and packing carried by said member and engaging said housing.

12. In mechanism of the class described, the combination of a housing, a shaft, means mounted on said shaft cooperating therewith to transmit axial thrust, comprising a pair of annular sheet metal members, at least one of said members being offset axially from the other, and packing between said members and engaging said housing.

In testimony whereof I affix my signature.

THOMAS ZIMMERMAN.